US011326576B2

(12) United States Patent
Randall

(10) Patent No.: US 11,326,576 B2
(45) Date of Patent: May 10, 2022

(54) WEB FOOT FOR A SHEAR WEB

(71) Applicant: Vestas Wind Systems A/S, Aarhus N. (DK)

(72) Inventor: Stephen Randall, Isle of Wight (GB)

(73) Assignee: Vestas Wind Systems A/S, Aarhus N (DK)

( * ) Notice: Subject to any disclaimer, the term of this patent is extended or adjusted under 35 U.S.C. 154(b) by 179 days.

(21) Appl. No.: 16/633,003

(22) PCT Filed: Jul. 24, 2018

(86) PCT No.: PCT/DK2018/050187
§ 371 (c)(1),
(2) Date: Jan. 22, 2020

(87) PCT Pub. No.: WO2019/020152
PCT Pub. Date: Jan. 31, 2019

(65) Prior Publication Data
US 2020/0217296 A1    Jul. 9, 2020

(30) Foreign Application Priority Data

Jul. 27, 2017 (DK) .......................... PA 2017 70593

(51) Int. Cl.
*F03D 1/06* (2006.01)
*B29D 99/00* (2010.01)
(Continued)

(52) U.S. Cl.
CPC ....... *F03D 1/0675* (2013.01); *B29D 99/0028* (2013.01); *B29L 2031/085* (2013.01);
(Continued)

(58) Field of Classification Search
CPC .............. F03D 1/0675; B29D 99/0028; B29L 2031/085; B64C 3/185; F05B 2230/60;
(Continued)

(56) References Cited

U.S. PATENT DOCUMENTS 4,113,910 A * 9/1978 Loyd ................. B29C 66/43441
428/162
4,331,723 A * 5/1982 Hamm ...................... B64C 1/12
428/61
(Continued)

FOREIGN PATENT DOCUMENTS

CN      104114856 A     10/2014
WO    2015082404 A1     6/2015
(Continued)

OTHER PUBLICATIONS

Danish Patent and Trademark Office, Search and Examination Report in PA 2017 70593, dated Feb. 20, 2018.
(Continued)

*Primary Examiner* — David E Sosnowski
*Assistant Examiner* — Wayne A Lambert
(74) *Attorney, Agent, or Firm* — Wood Herron & Evans LLP

(57) ABSTRACT

A shear web foot for a wind turbine blade is described. The shear web foot extends longitudinally and comprises a base for attaching to an internal surface of the blade and first and second side walls. The side walls extend respectively from opposite longitudinal sides of the base. At least part of each side wall is inclined relative to the base and inclined towards the other side wall. A web-foot interior is defined at least in part by the base and the first and second side walls. One or more internal walls are located in the web-foot interior. The one or more internal walls extend between the base and the first and/or second side walls and are spaced apart from the first and second side walls to define a plurality of chambers within the web-foot interior.

12 Claims, 11 Drawing Sheets

US 11,326,576 B2
Page 2

(51) Int. Cl.
*B29L 31/08* (2006.01)
*B64C 3/18* (2006.01)

(52) U.S. Cl.
CPC .......... *B64C 3/185* (2013.01); *F05B 2230/60* (2013.01); *F05B 2240/301* (2013.01); *F05B 2250/323* (2013.01); *F05B 2280/6003* (2013.01); *F05B 2280/6015* (2013.01)

(58) Field of Classification Search
CPC .......... F05B 2240/301; F05B 2250/323; F05B 2280/6003; F05B 2280/6015; Y02E 10/72
See application file for complete search history.

(56) References Cited

U.S. PATENT DOCUMENTS

| | | | | |
|---|---|---|---|---|
| 4,492,607 | A * | 1/1985 | Halcomb | B29C 70/083 156/242 |
| 4,566,945 | A * | 1/1986 | Ewald | D21F 1/02 162/344 |
| 4,662,587 | A * | 5/1987 | Whitener | B64C 3/185 428/116 |
| 5,026,595 | A * | 6/1991 | Crawford, Jr | B29D 99/0005 428/193 |
| 5,225,015 | A * | 7/1993 | Allaire | C03B 11/14 65/17.3 |
| 6,374,570 | B1 * | 4/2002 | McKague, Jr. | B29C 65/56 52/156 |
| 6,391,246 | B2 * | 5/2002 | Shiraishi | B29C 43/12 156/289 |
| 6,562,436 | B2 * | 5/2003 | George | B29D 99/0003 428/105 |
| 6,706,230 | B2 * | 3/2004 | Sato | B29C 70/44 425/111 |
| 7,244,487 | B2 * | 7/2007 | Brantley | B29C 65/561 244/123.7 |
| 7,393,488 | B2 * | 7/2008 | Grose | B29C 65/524 264/254 |
| 8,393,871 | B2 * | 3/2013 | Yarbrough | F03D 1/0683 416/226 |
| 8,540,833 | B2 * | 9/2013 | Deobald | B32B 3/04 156/180 |
| 8,763,253 | B2 * | 7/2014 | Kamaraj | B29C 70/34 29/897.2 |
| 9,359,060 | B2 * | 6/2016 | Kajita | B32B 3/266 |
| 9,370,921 | B2 * | 6/2016 | Butler | B64C 3/182 |
| 9,440,414 | B2 * | 9/2016 | Zarfos | B32B 5/26 |
| 9,463,864 | B1 * | 10/2016 | McCarville | B29C 70/30 |
| 9,566,739 | B2 * | 2/2017 | Chapman | G06F 3/0488 |
| 9,856,008 | B2 * | 1/2018 | Cheng | B29D 99/0003 |
| 10,040,274 | B2 * | 8/2018 | Kisch | B32B 3/20 |
| 10,131,092 | B1 * | 11/2018 | Cook | B29C 66/7292 |
| 10,213,970 | B2 * | 2/2019 | Heim | B29C 70/36 |
| 2003/0173460 | A1 | 9/2003 | Chapman | |
| 2010/0135817 | A1 * | 6/2010 | Wirt | F03D 1/0675 416/226 |
| 2011/0229333 | A1 | 9/2011 | Flach | |
| 2015/0252780 | A1 * | 9/2015 | Jonnalagadda | F03D 1/0675 416/226 |
| 2017/0058867 | A1 | 3/2017 | Yarbrough et al. | |
| 2017/0074240 | A1 * | 3/2017 | Caruso | B29C 65/4815 |
| 2019/0353143 | A1 * | 11/2019 | Girolamo | B29D 99/0028 |

FOREIGN PATENT DOCUMENTS

| | | |
|---|---|---|
| WO | 2015134823 | 9/2015 |
| WO | 2016066816 A1 | 5/2016 |
| WO | 2016177375 A1 | 11/2016 |
| WO | 2017092766 | 6/2017 |

OTHER PUBLICATIONS

European Patent Office, International Search Report and Written Opinion in PCT Application Serial No. PCT/DK2018/050187, dated Oct. 9, 2018.
China National Intellectual Property Administration, First Notification of Office Action in CN Application No. 201880054906.8, dated Oct. 26, 2020.
China National Intellectual Property Administration, Decision of Rejection in CN Application No. 201880054906.8, dated Dec. 1, 2021.

* cited by examiner

WEB FOOT FOR A SHEAR WEB

TECHNICAL FIELD

The present invention relates generally to wind turbine blades, and more specifically to a web foot for a shear web.

BACKGROUND

Modern wind turbine blades typically comprise a shell of composite construction and one or more spars, which serve as the primary load-bearing structures of the blade. Known spar structures comprise spar caps and shear webs. The spar caps are longitudinally-extending beams, designed to carry bending loads and may be bonded to or integrated within the structure of the blade shell. The shear webs connect between opposed spar caps on the windward and leeward sides of the blades and carry the shear loads. The shear webs typically comprise a longitudinally-extending panel with upper and lower flanges for bonding to the respective the spar caps.

A known shear web is described in WO2016177375A1. The shear web comprises a web panel with upper and lower flanges defined by longitudinal structures having a T-shaped cross-section. These T-shaped structures comprise a base defining a flange and an upstand projecting from the centre of the base. The upstand is integrated with the web panel, whilst the base may be adhesively bonded to a spar cap in the finished blade. In use, loads are transferred from the spar caps through the central upstand of the T structures into the web panel. The loads are therefore concentrated on the centre of the adhesive bonding the flange to the spar cap, whilst adhesive closer to the edges of the flange does not contribute significantly to transferring the loads. An example of a prior art T-shaped web foot is shown in FIG. 7.

There is a continual drive to produce larger wind turbine blades capable of capturing more energy from the wind. However, as blade size increases, the loads experienced by the blades also increases significantly. It therefore becomes important to avoid high concentrations of loads in such blade structures.

Against this background, the present invention aims to provide an alternative interface between the shear webs and spar caps of a wind turbine blade, which avoids substantial concentrations of load.

SUMMARY OF THE INVENTION

According to a first aspect of the present invention there is provided a wind turbine blade shear web foot, the shear web foot extending longitudinally and comprising: a base for attaching to an internal surface of the blade; first and second side walls extending respectively from opposite longitudinal sides of the base, at least part of each side wall being inclined relative to the base and inclined towards the other side wall, a web-foot interior defined at least in part by the base and the first and second side walls; and one or more internal walls in the web-foot interior, the one or more internal walls extending between the base and the first and/or second side walls and being spaced apart from the first and second side walls to define a plurality of chambers within the web-foot interior.

The side walls may mutually converge with increasing perpendicular distance from the base. The side walls may mutually converge to define a region of maximum height of the shear web foot measured perpendicular to the base. The inclined parts of the side walls preferably converge to define an apex of the web foot. The apex is preferably opposite the centre of the base when the web foot is viewed in transverse cross-section. The apex defines the maximum height of the web foot measured perpendicular to the base. Alternatively, the side walls may be spaced apart at the maximum height of the web foot. For example, the web foot may have a flat or curved top.

The or each internal wall is preferably substantially perpendicular to the base. The web foot may comprise a plurality of internal walls spaced apart from each other and defining chambers in-between. The chambers may contain filler material such as foam core, balsa, low-density plastic or resin. Alternatively, the chambers may be hollow.

The base, side walls, and internal walls are preferably formed from composite material comprising one or more fibrous plies. The fibres of the plies may comprise glass, carbon, aramid or any other suitable fibres used in composite materials. The plies may be dry or pre-impregnated with resin depending upon the manufacturing methods used e.g. prepreg The base, side walls and/or internal walls preferably have a laminate structure. In some embodiments, plies may be common to the base, side walls and/or internal walls. For example, some or all of the plies forming the internal walls may also at least partially form the base and/or a side wall of the web foot.

The first and second side walls are preferably inclined at an angle between 30 to 60 degrees to the base.

The web foot may be any suitable shape, but in preferred embodiments the web foot is substantially triangular or shaped as an irregular pentagon in transverse cross-section.

The web foot may comprise a substantially central internal wall extending substantially between the base and the apex of the web foot.

The web foot is preferably formed by pultrusion. Alternatively, the web foot may be formed by any suitable technique, for example moulding.

The invention also provides a shear web for a wind turbine blade comprising a web panel and a shear web foot as described above. The web foot may be formed separately before being integrated with the web panel. Alternatively, the web foot may be formed integrally with the shear web panel. The web panel may comprise a laminate formed from a plurality of plies. At least some of the plies forming the web panel may also at least partially form a side wall and/or an internal wall of the shear web foot. The plies of the web panel may be tapered onto the shear web foot.

The invention also provides a wind turbine blade comprising a spar cap and a shear web as described above, wherein the base of the web foot is attached to the spar cap and the side walls and internal walls of the web foot provide load-transfer paths between the spar cap and the web panel.

According to a further aspect of the present invention, there is provided a web foot for a shear web of a wind turbine blade, the web foot comprising an outer shell formed as a composite laminate that is substantially triangular or shaped as an irregular pentagon in transverse cross-section, wherein the outer shell defines a substantially hollow interior.

Features described in relation to one aspect of the invention are equally applicable to other aspects. Repetition of such features is avoided purely for reasons of conciseness.

BRIEF DESCRIPTION OF THE DRAWINGS

Embodiments of the invention will now be described, by way of non-limiting example only, with reference to the accompanying figures, in which.

DETAILED DESCRIPTION

Figure 1:
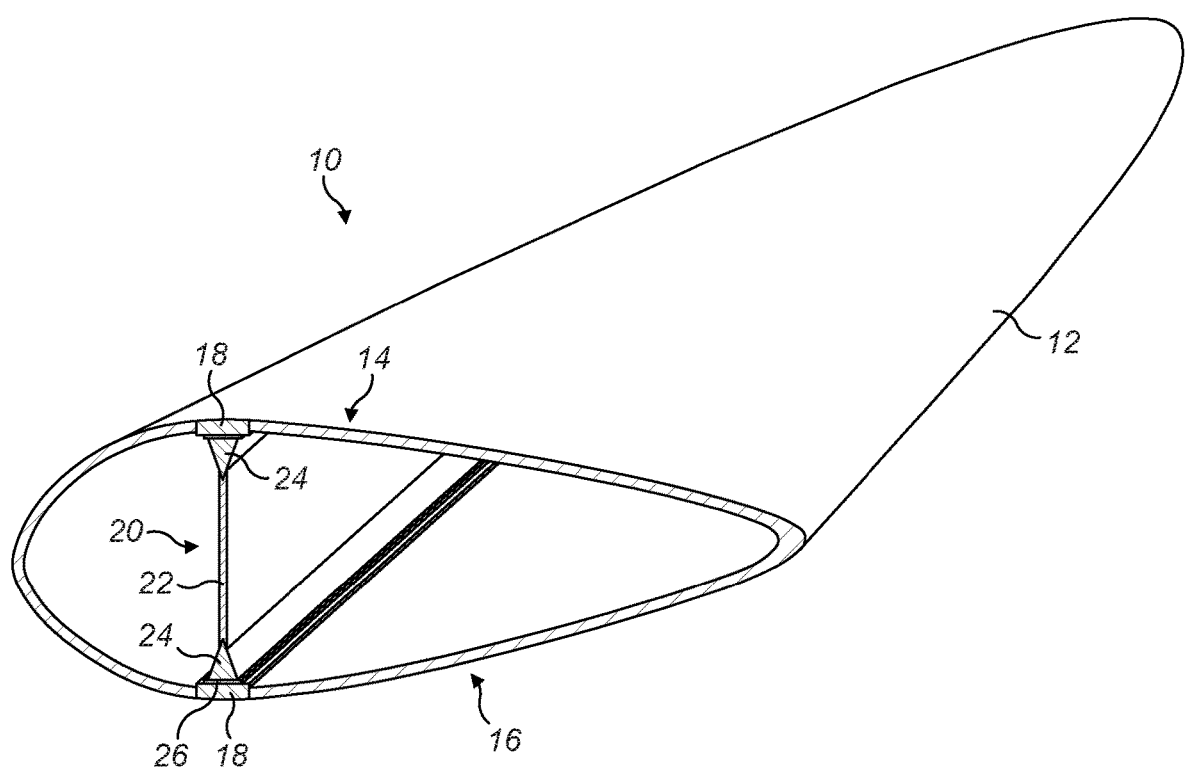
FIG. 1 is a schematic cross-sectional perspective view of part of a wind turbine blade according to an embodiment of the present invention.
Figure 2:
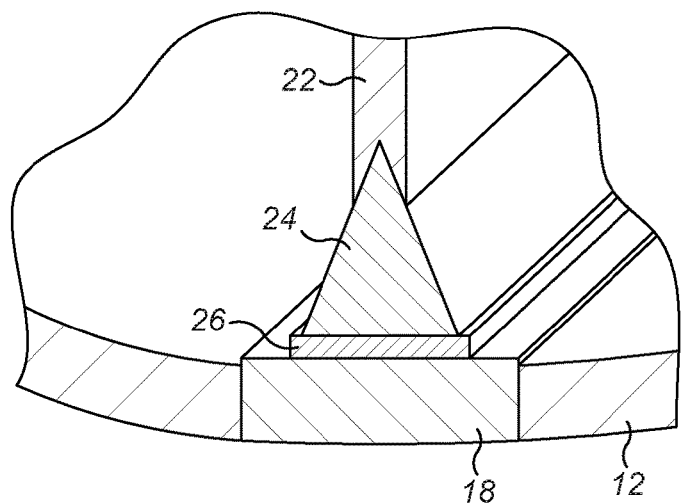
FIG. 2 is an enlarged view of a portion of FIG. 1 showing a web foot of a shear web bonded to a spar cap.

FIG. 1 shows part of a wind turbine blade 10 according to an embodiment of the present invention. The wind turbine blade 10 comprises a shell 12 having a leeward side 14 and a windward side 16. The shell 12 is formed as a laminate of composite material, for example it may comprise primarily glass-fibre reinforced plastic (GRP). In this example, spar caps 18 are embedded within the laminate structure of the shell 12. A longitudinally-extending shear web 20 is arranged inside the blade shell 12. The shear web 20 comprises a web panel 22 and first and second web feet 24. The web feet 24 are bonded to the spar caps 18 via adhesive 26, as shown more clearly in the enlarged view of FIG. 2.

Further details of the web feet 24 will now be described with reference to the remaining figures.

Figure 3:
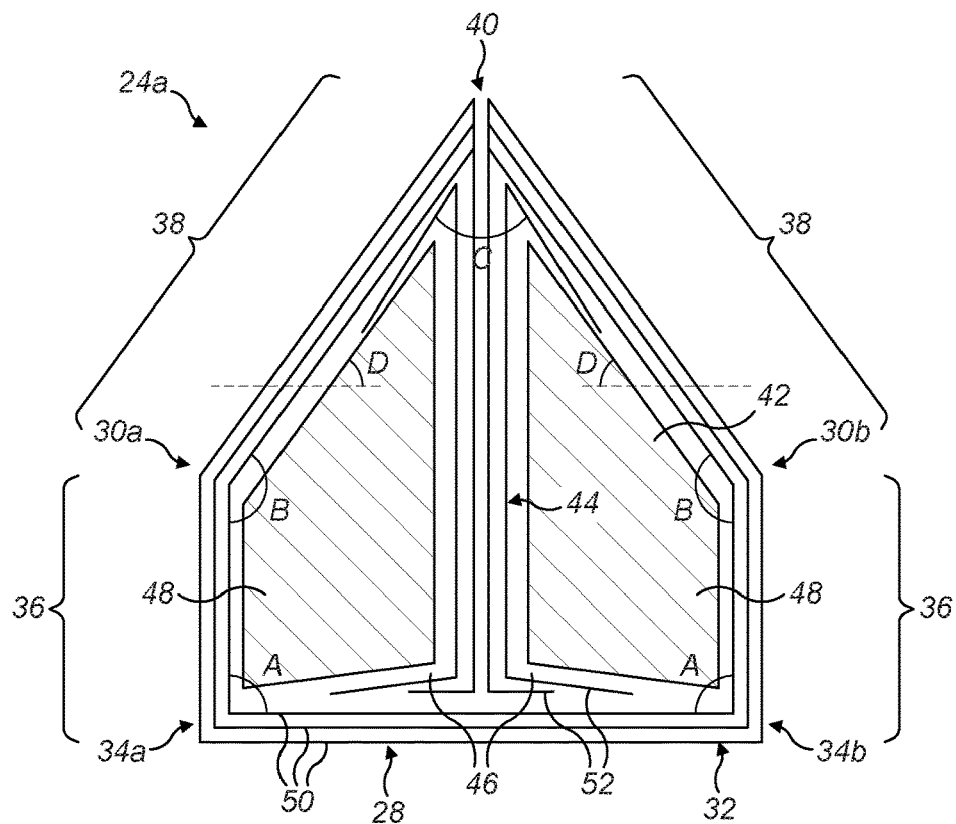
FIG. 3 schematically shows a web foot according to a first embodiment of the present invention.

Referring to FIG. 3, this shows a web foot 24a according to a first embodiment of the present invention in transverse cross-section. The web foot 24a extends longitudinally substantially perpendicular to the page, and in this example the web foot 24a is of constant cross-section. The web foot 24a in this example is shaped substantially as an irregular pentagon (or 'house-shaped') in cross-section.

The web foot 24a comprises a base 28 and first and second side walls 30a, 30b. The base 28 is substantially flat. An underside 32 of the base 28 defines a flange for bonding to a spar cap or other internal surface of a wind turbine blade. The first and second side walls 30a, 30b extend respectively from opposite longitudinal sides 34a, 34b of the base 28. Each side wall 30a, 30b in this embodiment comprises first and second portions 36, 38. The first portions 36 extend perpendicularly from the base 28. The second portions 38 are inclined relative to the base 28. The second portions 38 are also inclined relative to the first portions 36. As shown, the second portion 38 of each side wall 30a or 30b is inclined towards the other side wall 30b or 30a.

The side walls 30a, 30b are inclined such that they mutually converge with increasing perpendicular distance from the base 28. The second portions 38 of the side walls 30a, 30b in this example mutually converge to define an apex 40 at a point of maximum height of the web foot 24a. The apex 40 in this example is opposite a substantially central portion of the base 28. Other embodiments are envisaged in which the side walls 30a, 30b do not define an apex 40. For example, in other embodiments the web foot may have a flat or curved top.

As mentioned above, the web foot 24a in this example is shaped as an irregular pentagon in transverse cross-section. The transverse shape may be defined by various internal angles A, B, C and D as indicated in FIG. 3. In this embodiment the angle A between the base 28 and the first portions 36 of the respective side walls 30a, 30b is approximately 90 degrees; the angle B between the first and second portions 36, 38 of the respective side walls 30a, 30b is approximately 145 degrees; and the angle C at the apex 40 of the web foot 24a is approximately 70 degrees. The inclined second portions 38 of the side walls 30a, 30b are therefore inclined relative to the base 28 at an angle D of approximately 55 degrees in this example. The various angles may be different in other embodiments of the web foot. Preferably, however, at least part of the first and second side walls 30a, 30b are inclined at an angle between 30 to 60 degrees to the base 28 (i.e. angle D in FIG. 3).

The web foot 24a comprises a web-foot interior 42, which in this example is substantially enclosed by the base 28 and the first and second side walls 30a, 30b. An internal wall 44 extends inside the web-foot interior 42. The internal wall 44 extends between the base 28 and the inclined second portions 38 of the side walls 30a, 30b; in this example, the internal wall 44 extends substantially perpendicularly to the base 28. The internal wall 44 in this example is substantially central with respect to the base 28, when the web foot 24a is seen in transverse cross-section. Accordingly, the internal wall 44 extends between the base 28 and the apex 40 of the web foot 24a.

The internal wall 44 is spaced apart from the first and second side walls 30a, 30b to define a plurality of chambers 46 within the web-foot interior 42. The central internal wall 44 in this example defines two chambers 46, one on each side of the internal wall 44. The chambers 46 in this example are substantially trapezoidal and are filled with filler material 48, for example foam, balsa, polystyrene or suitable low-density resin or plastic. The filler material 48 in this example also has a substantially-trapezoidal cross-section. In other embodiments the chambers 46 may not contain filler material 48, and may instead be empty or hollow, e.g. air-filled chambers.

The base 28, side walls 30a, 30b, and internal wall 44 are preferably formed from composite material. The composite material may comprise suitable reinforcing fibres, for example glass or carbon fibres, and a matrix material such as resin, e.g. epoxy or polyurethane. The base 28, side walls 30*a*, 30*b* and internal wall 44 are preferably each formed from one or more plies 50, 52 of reinforcing material, e.g. glass-fibre composite plies, such that the web foot 24*a* has a laminate structure. In the schematic illustration of FIG. 3, the base 28, side walls 30*a*, 30*b* and internal wall 44 are each formed from multiple plies 50, 52.

Some of the plies 50, 52 may be common to the base 28, side walls 30*a*, 30*b* and internal wall 44: for example as seen in FIG. 3, plies 50 forming the base 28 also form the side walls 30*a*, 30*b*. Additionally, plies 52 forming the internal wall 44 additionally form parts of the base 28 and side walls 30*a*, 30*b* to add additional thickness and strength in the centre of the base 28 and near the apex 40 of the web foot 24*a*. The ply arrangement shown in FIG. 3 results in the number of plies 50, 52 forming the base 28 increasing towards the centre of the base 28, such that the base 28 increases in thickness and strength towards its centre. Also, the number of plies 50, 52 forming the side walls 30*a*, 30*b* increases towards the apex 40, resulting in the side walls 30*a*, 30*b* having increased strength and thickness towards the apex 40.

Figure 4:
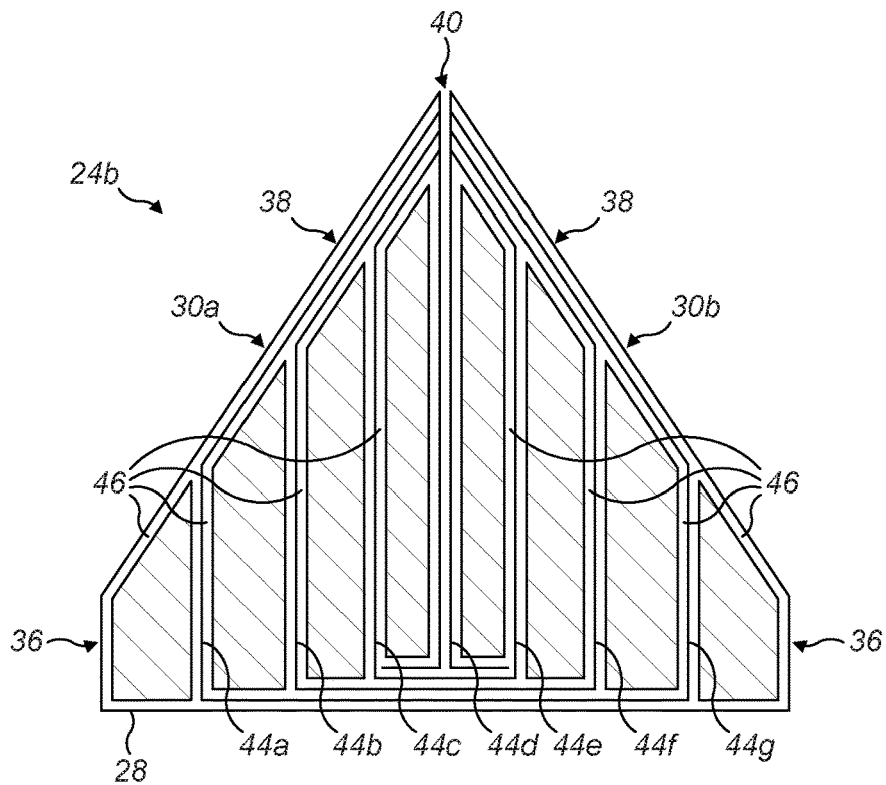
FIG. 4 schematically shows a web foot according to a second embodiment of the present invention.

Referring to FIG. 4, this schematically shows a web foot 24*b* according to a second embodiment of the present invention in transverse cross-section. In common with the previous embodiment, the web foot 24*b* is shaped as an irregular pentagon and comprises essentially similar parts to the previously-described embodiment. The same reference numerals will therefore be used to describe common/equivalent features between embodiments. In contrast to the previous embodiment, the web foot 24*b* shown in FIG. 4 comprises a plurality of internal walls 44*a-g*: seven in total in the illustrated example.

The internal walls 44*a-g* include a substantially central internal wall 44*d* and three further walls 44*a-c* and 44*e-g* on each side of the central wall 44*d*. Any suitable number of internal walls may be used in other examples. The internal walls 44*a-g* are each substantially perpendicular to the base 28, and extend between the base 28 and the inclined portions 38 of the side walls 30*a*, 30*b*. The internal walls 44*a-g* are spaced apart from one another to define a plurality of chambers 46 in-between. In this example, eight chambers 46 are defined inside the web foot 24*b*. Each chamber 46 contains filler material 48 of substantially trapezoidal cross section. In other examples the chambers 46 could be hollow, or some chambers 46 may contain filler material 48 and other chambers 46 may be hollow.

As shown in FIG. 4, the plies forming the internal walls 44*a-g* also form parts of the base 28 and side walls 30*a*, 30*b*. With the ply arrangement shown in FIG. 4, this results in the number of plies forming the base 28 increasing towards the centre of the base 28, such that the base 28 increases in thickness and strength towards its centre. Also, the number of plies forming the side walls 30*a*, 30*b* increases towards the apex 40, resulting in the side walls 30*a*, 30*b* having increased strength and thickness towards the apex 40.

Figure 5:
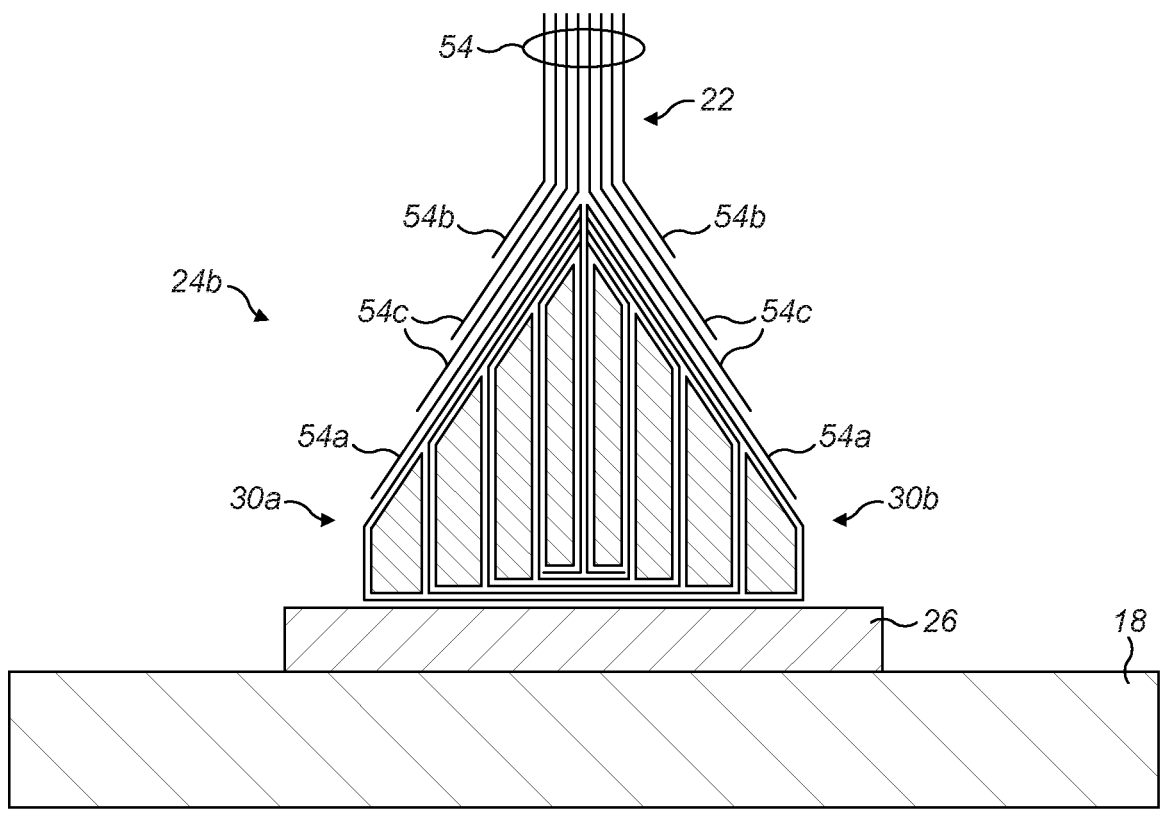
FIG. 5 schematically shows the web foot of FIG. 4 integrated with a shear web panel and bonded to a spar cap or other internal surface of a wind turbine blade.

Referring now to FIG. 5, this schematically shows the web foot 24*b* bonded to a spar cap 18 or other internal surface of a blade via a layer of adhesive 26. FIG. 5 also shows the web foot 24*b* integrated with a shear web panel 22. It can be seen that the shear web panel 22 is also a composite laminate formed from a plurality of plies 54. At the interface with the web foot 24*b*, the plies 54 of the shear web panel 22 are arranged to form an inverted Y-shape in transverse cross-section. This shape is generally complementary in shape to the outer profile of the web foot 24*b*. The web foot 24*b* panel 22 therefore fits between the splayed legs of the inverted Y.

The plies 54 of the shear web panel 22 may extend to cover part or all of the side walls 30*a*, 30*b* of the web foot 24*b*. In this example, the plies 54 of the web panel 22 are tapered onto the web foot 24*b*. The plies 54 of the web panel 22 may each cover different amounts of the side walls 30*a*, 30*b*. In the example illustrated in FIG. 5, the innermost plies 54*a* of the web panel 22 extend to cover a majority of the side walls 30*a*, 30*b* whilst the outermost plies 54*b* of the web panel 22 extend to cover only a portion of the side walls 30*a*, 30*b* near the apex 40. Intermediate plies 54*c* of the web panel 22 extend by intermediate amounts over the side walls 30*a*, 30*b* to form a step-wise tapering of the shear web plies 54 onto the web foot 24*b*. Integrating the plies 54 of the shear web panel 22 with the web foot 24*b* in this way is particularly advantageous as it provides a direct path for transferring loads from the web foot 24*b* into the laminate of the web panel 22.

Figure 6:
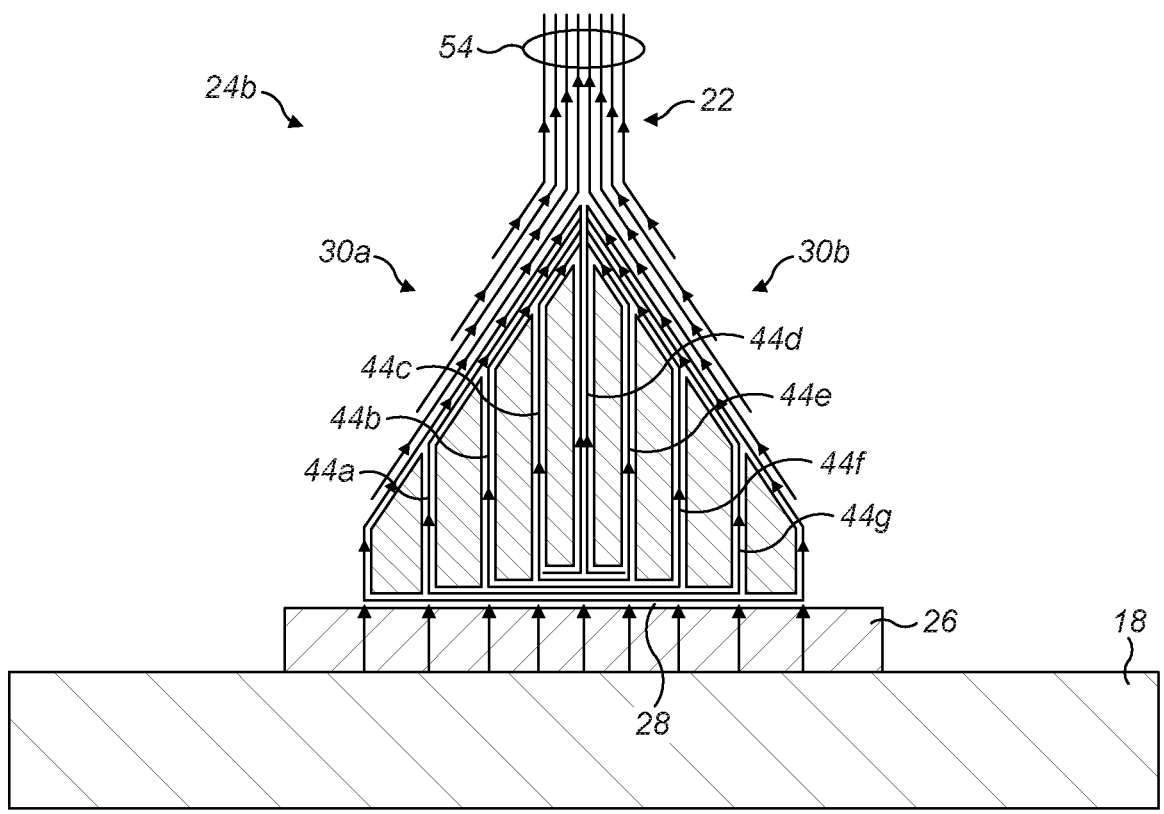
FIG. 6 schematically shows load-transfer paths through the web foot of FIG. 5.

Referring to FIG. 6, this schematically represents (by means of arrows) the loads transferred through the web foot 24*b* in use. As shown, the loads are transferred from the spar caps 18, through the adhesive 26, through the web foot 24*b* and into the shear web panel 22. In the web foot 24*b*, loads are transferred through the side walls 30*a*, 30*b* and through the internal walls 44*a-g* of the web foot 24*b*. The internal walls 44*a-g* therefore provide load-transfer paths in addition to the side walls 30*a*, 30*b*. The transverse spacing between the internal walls 44*a-g* and the side walls 30*a*, 30*b* results in the loads being spread out and distributed substantially evenly over the full width of the base 28 of the web foot 24*b*. The loads are accordingly spread out and distributed evenly across the adhesive bond line 26 between the web foot 24*b* and the spar cap 18.

Figure 7:
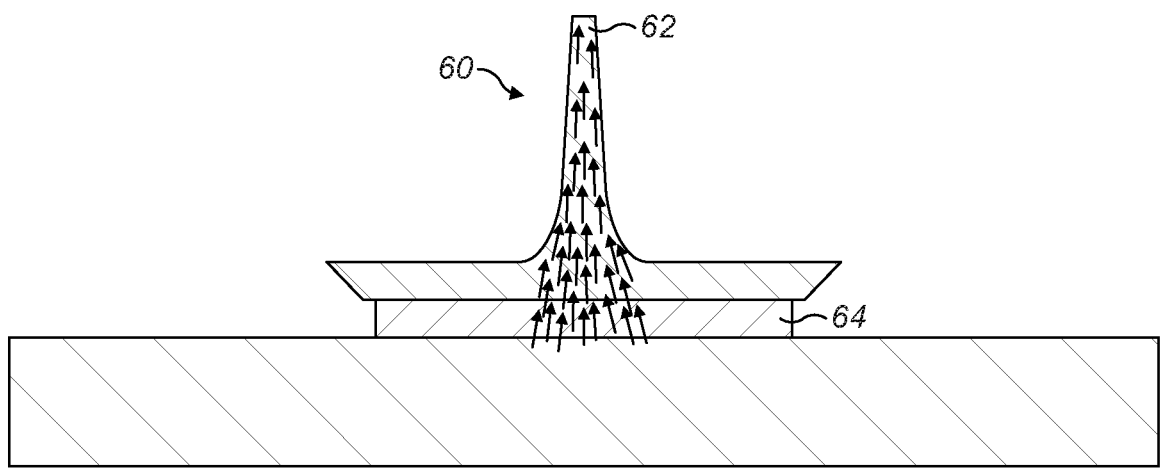
FIG. 7 schematically shows load-transfer paths through a prior art T-shaped web foot.

By way of comparison, FIG. 7 schematically illustrates the loading experienced by a T-section web foot 60 according to the prior art. As shown, loads are concentrated directly beneath the upstand 62 of the T-shaped flange. This results in loads being concentrated in the centre of the adhesive 64 whilst adhesive beneath the edges of the flange does not contribute significantly to load transfer. By spreading the load over the adhesive (as shown in FIG. 6), the web feet of the present invention allow the adhesive bond line 26 to handle significantly higher loads than prior art web feet.

Figure 8:
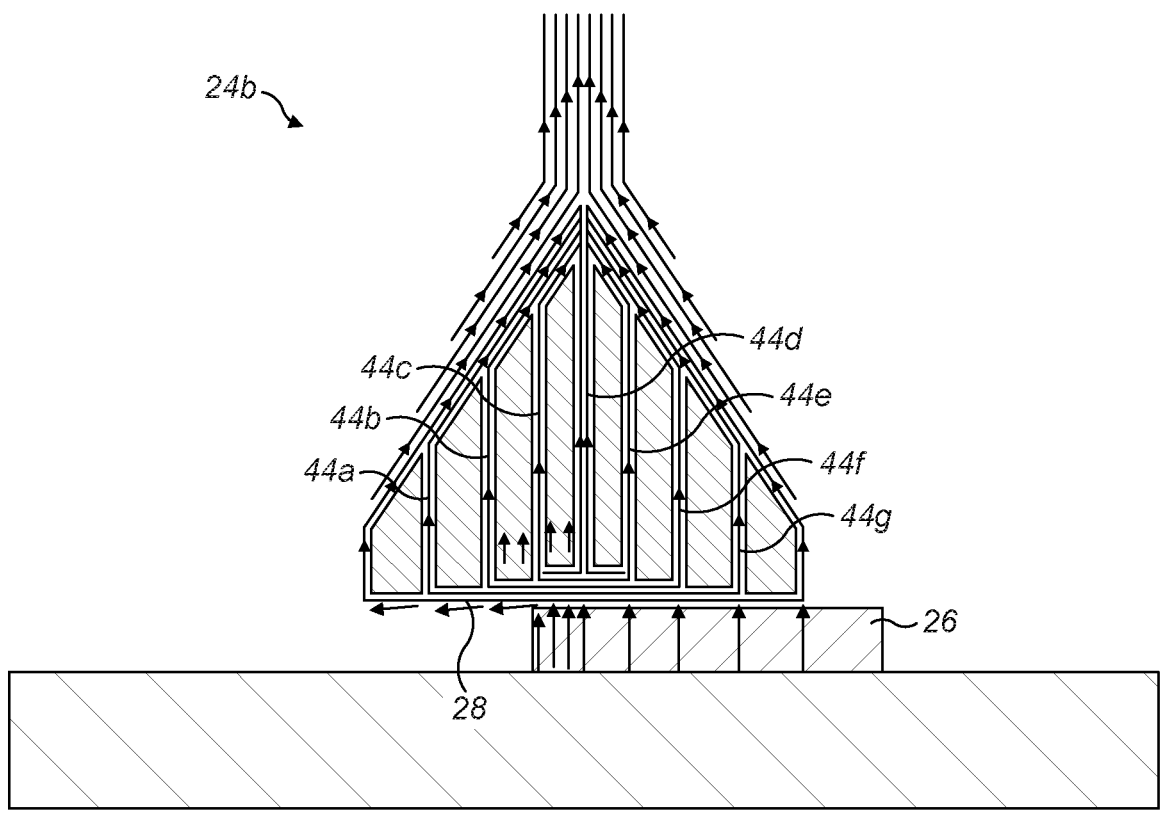
FIG. 8 schematically shows load-transfer paths through a web foot according to an embodiment of the present invention in the case of misplaced adhesive in a bond line.

FIG. 8 shows a web foot 24*b* according to an example of the invention in a situation where the adhesive 26 may have been misplaced (e.g. offset from an optimal position) or insufficient adhesive may have been used. As shown, the adhesive 26 does not cover the full width of the base 28 of the web foot 24*b*. In this scenario, the spreading of loads by virtue of the internal walls 44*a-g* reduces the risk of failure in the bond line 26 because loads are still distributed across the adhesive 26 allowing the adhesive 26 to contribute to load-handling across its full width. It can also be seen by way of the arrows in FIG. 8 that loads are transferred transversely through the base 28 and up through the vertical walls 44*a* and 44*b* and side wall 30*a* above the part of the base 28 where adhesive 26 is missing. This serves to further spread load through the web foot 24*b* and minimises the risk of failure of the bond line 26.

Figure 9:
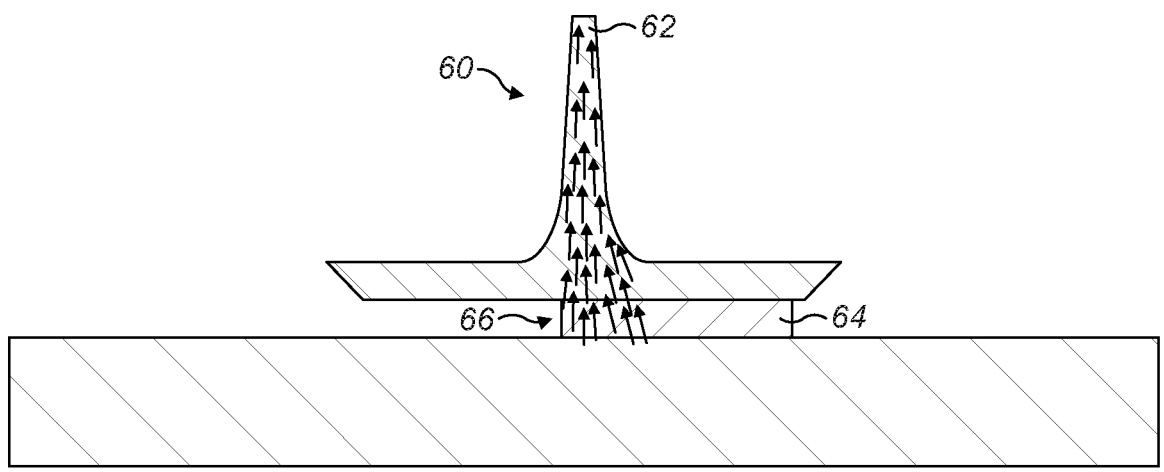
FIG. 9 schematically shows load-transfer paths through a prior art T-shaped web foot arrangement in the case of misplaced adhesive in the bond line.

By way of comparison, FIG. 9 schematically illustrates the loading experienced by a T-section web foot 60 according to the prior art in the situation where adhesive 64 is misplaced. In this case, the concentration of loads beneath the upstand 62 means that the edge 66 of the adhesive 64 is subject to highly concentrated loading. By spreading loads evenly across the bond line 26 (as shown in FIG. 8), the web feet 24a, 24b according to the present invention are more able to accommodate misplaced or insufficient adhesive without risking failure in the bond line 26.

Figure 10:
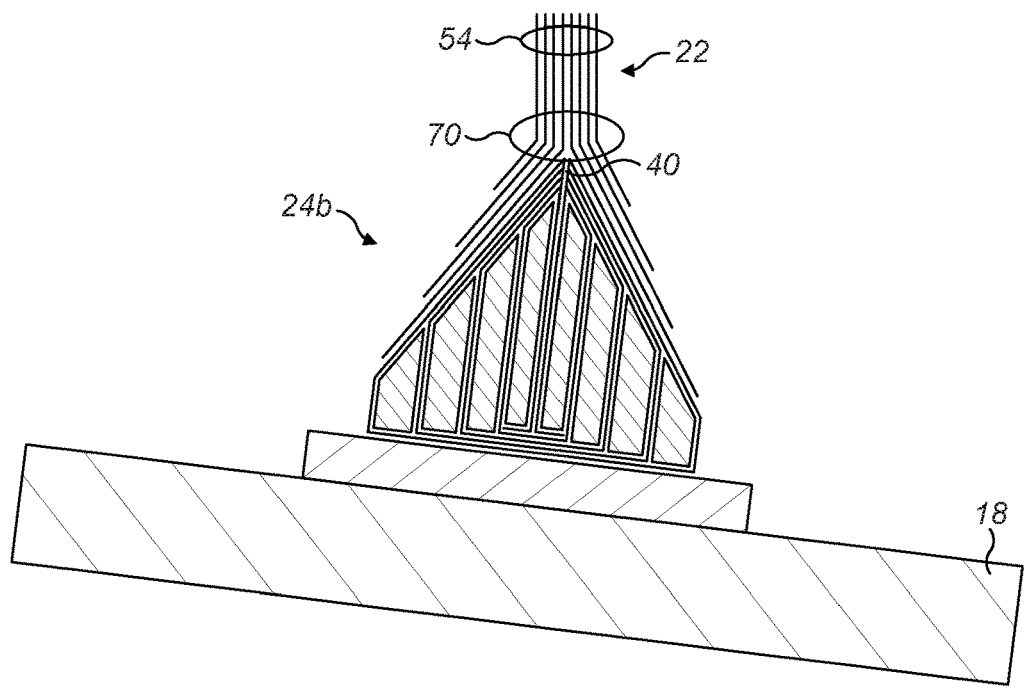
FIG. 10 shows a web foot according to an embodiment of the present invention integrated with a kinked shear web panel and bonded to an inclined surface.

In order to accommodate the curvature of a wind turbine blade shell, it may be required to incline the web feet 24 relative to the web panel 22 in some parts of the shear web 20. The situation is schematically illustrated in FIG. 10, which shows a web foot 24b bonded to an inclined surface 18, e.g. a spar cap or other internal surface of a blade. The web panel 22 includes a kink 70 near the apex 40 of the web foot 24b, which allows the web foot 24b to be mounted flush against the inclined surface 18. The splayed plies 54 of the web panel 22 at the interface with the web foot 24b present a load-handling advantage in such kinked-web arrangements. In particular, it will be appreciated that the increased kink angle in the plies 54 on one side of the web panel 22 is balanced by a straightening of plies 54 on the other side of the web panel 22 at the kink 70. High strains at the kink 70 in the web panel 22 are therefore avoided due to this load balancing.

Figure 11:
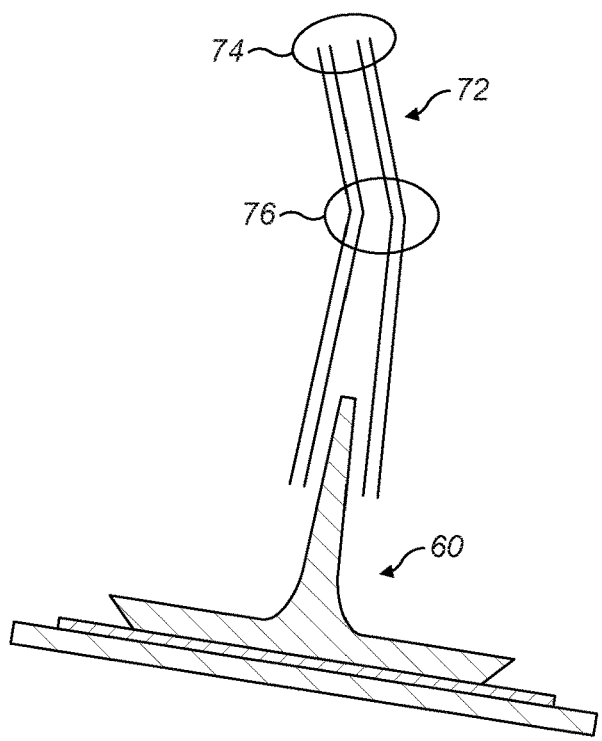
FIG. 11 shows a prior art T-shaped web foot integrated with a kinked shear web panel.

By way of comparison, FIG. 11 shows the equivalent situation when a prior art T-shaped web foot 60 is used with a kinked web panel 72. In this case it can be seen that the plies 74 throughout the thickness of the web panel 72 are similarly kinked and there is no balancing of loads. This arrangement therefore results in higher strains at the kink 76 compared to the situation shown in FIG. 10.

In summary, the web feet 24 of the present invention present a number of structural and load-handling advantages over prior art web feet, such as T-shaped web feet. The internal walls 44 of the web feet 24 of the present invention allow loads to be spread across the web feet 24, which avoids high concentrations of loads in the adhesive bond lines 26. The adhesive may therefore be able to handle higher overall loads in comparison with the prior art without risking failure. The web feet 24 of the present invention therefore provide a stronger interface between the shear web 20 and spar caps 18 or other blade surface than prior art solutions. Spreading the load across the adhesive also reduces the risk of failure in the bond lines in cases where adhesive may be misplaced or if insufficient adhesive is used. The bond lines are therefore more robust and tolerant to misplaced or insufficient adhesive. Further, the interface between the shear web panel 22 and the web feet 24 is more able to accommodate kinks 70 in a web panel 22 due to advantageous load balancing at a kink.

A process for making a shear web 20 comprising a web foot 24b according to an example of the present invention will now be described briefly with reference to FIG. 12.

Figure 12:
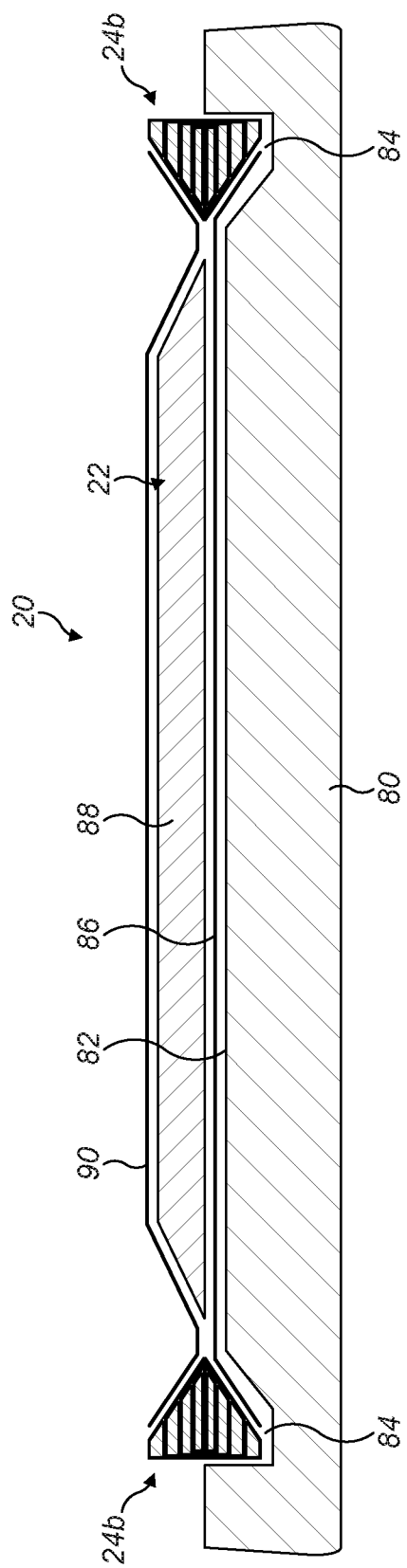
FIG. 12 schematically shows a mould tool for making a shear web comprising web feet according to an example of the present invention.

FIG. 12 is a schematic cross-section through a shear web mould tool 80 illustrating one method for making the shear web 20. The mould tool 80 in this example comprises a generally flat mould surface 82. First and second recesses 84 shaped to accommodate the respective web feet 24b are provided respectively at each end of the mould surface 82. The laminate layup process may initially involve arranging a first set of plies 86 forming a first side of the shear web panel 22 on the mould surface 82. The first set of plies 86 may extend into the recesses 84, and will overlap the web feet 24b. The web feet 24b are next arranged in the recesses 84. Core material 88, e.g. foam core, may be arranged on the mould surface 82 on top of the first plies 86 to form a body of the shear web panel 22. A second set of plies 90 may be arranged on top of the core material 88 (if present). The second set of plies 90 may also extend to cover part or all of the web feet 24b. Once the material has been laid up, it may be then be integrated by any suitable composites moulding technique. For example, a vacuum bag (not shown) may be used to cover the layup and may be sealed against the mould tool 80. Air may be evacuated from beneath the vacuum bag and resin may be admitted into the evacuated region to infuse throughout the layup. The resin may then be cured to integrate the various parts of the shear web panel 22 together, and simultaneously to integrate the web feet 24b with the panel 22.

The web feet 24 in the above examples may be formed by any suitable method, for example moulding or pultrusion. A pultrusion process can be employed in which strips of filler material is fed through a pultrusion die together with resin-coated plies to form the web feet 24 in a single continuous process. The web feet 24 may have a constant cross-section along the length of the shear web panel 22. Alternatively, the web feet 24 may be formed of a plurality of sections each having a different size or shape to accommodate the varying geometry of a wind turbine blade.

As an alternative, the web feet 24 may be formed integrally with the shear web panel 22. An example of this will now be discussed with reference to FIGS. 13 and 14.

Figure 13:
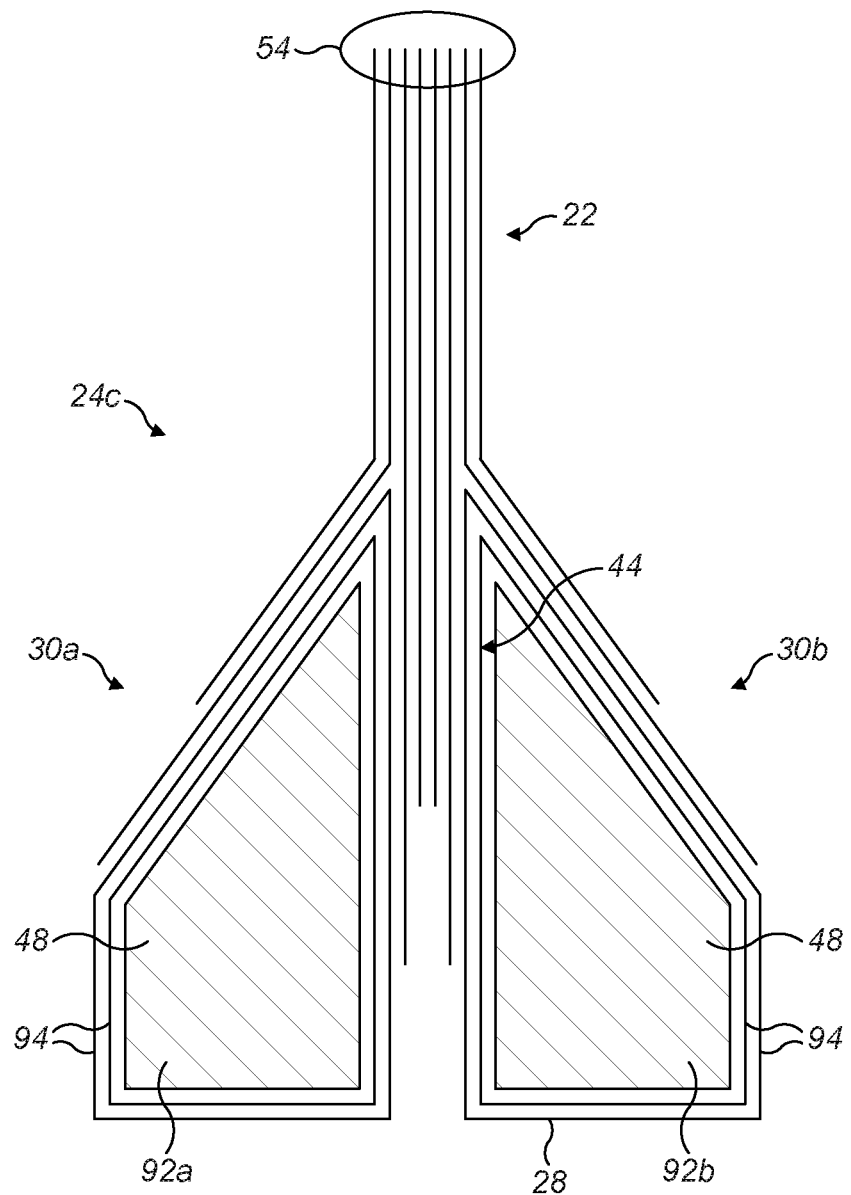
FIG. 13 schematically shows a web foot according to a third embodiment of the present invention wherein the web foot is formed integrally with a shear web panel.

FIG. 13 shows a web foot 24c according to a further example of the present invention. The web foot 24c in this example comprises first and second sections 92a, 92b. In this example, each section 92a, 92b is trapezoidal in cross-section. The first and second sections 92a, 92b each comprise filler material 48 surrounded by composite plies 94. The first and second sections 92a, 92b may be formed, for example, by pultrusion in which the filler material 48 is fed through a pultrusion die together with the plies 94. The web foot 24c comprises side walls 30a, 30b formed in part by the plies 94 surrounding the filler material 48, and in part by plies 54 of a web panel 22, which are tapered onto the web foot 24c, similar to the previous embodiment. The web foot 24c further comprises an interior wall 44, which in this example is formed from intermediate plies 54 of the web panel 22, which extend between the first and second sections 92a, 92b. A base 28 of the web foot 24c is formed from the plies 94 of the first and second sections 92a, 92b, which surround the filler material 48. The materials forming the various parts of the web foot 24c may be the same as those described in relation to the previous embodiments.

Figure 14:
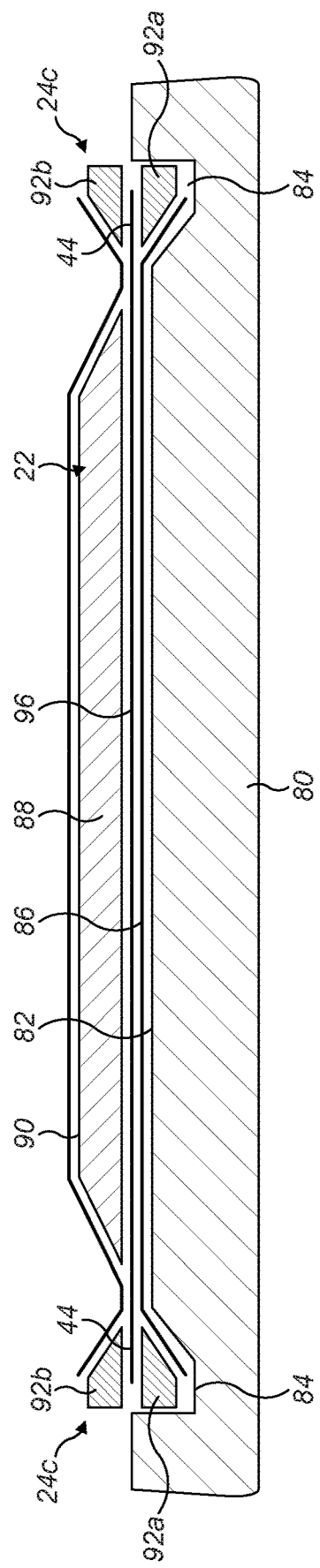
FIG. 14 schematically shows a mould tool for making the shear web of FIG. 13.

Referring to FIG. 14, this shows a method of forming the web feet 24c integrally with the web panel 22. The mould tool 80 shown in FIG. 14 is substantially identical to the mould tool 80 described previously with reference to FIG. 12. The layup process in this example comprises first arranging a first set of plies 86 on the mould surface 82 such that they extend into the cavities 84 at each end of the mould surface 82. Next, a first section 92a of the web foot 24c is arranged in each cavity 84. Further plies 96 are arranged on top of the first set of plies 86 to form part of the web panel 22. The further plies 96 also extend over the first sections 92a of the web feet 24c to form the internal walls 44 of the web feet 24c. Next, core material 88 may be arranged on top of the plies 86, 96 above the mould surface 82 to form a body of the shear web panel 22. Second sections 92b of the web feet 24c are then placed on top of the first sections 92a and on top of the plies 96 forming the internal walls 44 of the web feet 24c. Further plies 90 are then arranged on top of the core material 88 and such that they extend over the second sections 92b of the web feet 24c. The layup may then be subjected to a suitable composite moulding process, for example vacuum-assisted resin infusion as previously described, to integrate the various components together.

The method described above may be readily modified to form integral web feet with additional internal walls, for example by forming the web feet using more than two sections and extending further plies of the shear web between those sections to form multiple internal walls of the web feet.

Further variants of the web feet 24 will now be described briefly with reference to the remaining figures.

Figure 15:
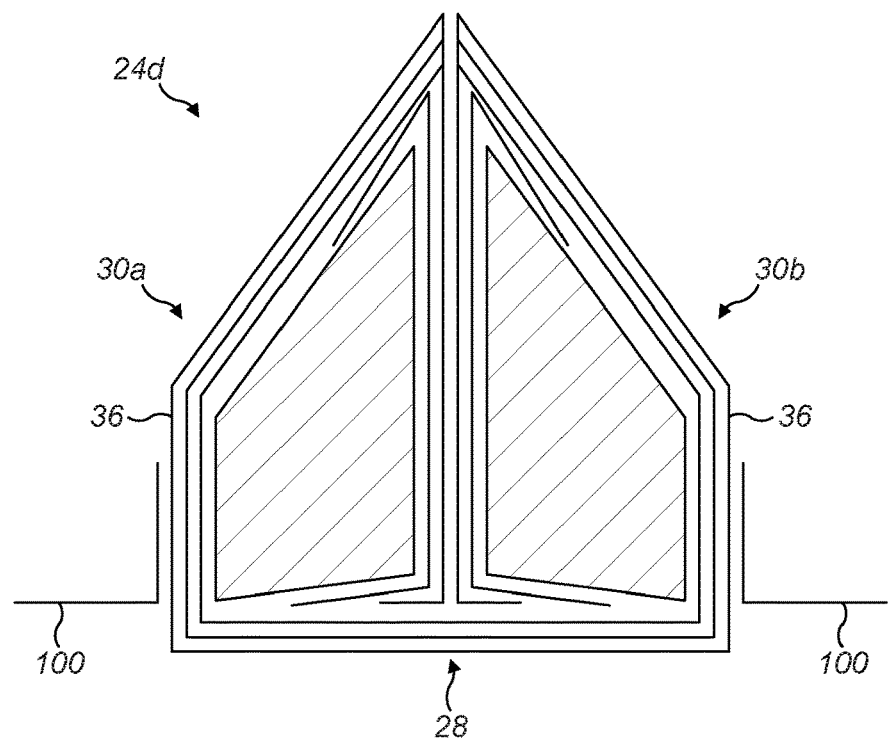
FIG. 15 schematically shows a web foot similar to the first embodiment with the addition of glue catchers.

FIG. 15 shows a web foot 24*d* similar to the web foot shown 24*a* in FIG. 3, but additionally including flanges 100 projecting from the side walls 30*a*, 30*b* of the web foot 24*d*. These flanges 100 are known as 'glue catchers' and are provided to retain adhesive that may be squeezed out from the edges of the base 28 to prevent that adhesive from becoming detached inside the finished blade. If adhesive should become detached inside the blade, then it may cause noise inside the blade and may risk damaging sensitive components inside the blade. The glue catchers 100 advantageously prevent this from happening. The flanges 100 in this example project substantially perpendicular to the first portions 36 of the side walls 30*a*, 30*b*, i.e. substantially parallel to the base 28. The glue catchers 100 may be formed integrally with the web feet 24*d*, for example in a pultrusion process or moulding process, or they be attached subsequently. In other examples the glue catchers 100 may be angled or shaped differently. Glue catchers 100 may be used in conjunction with any of the web feet 24 described herein.

Figure 16:
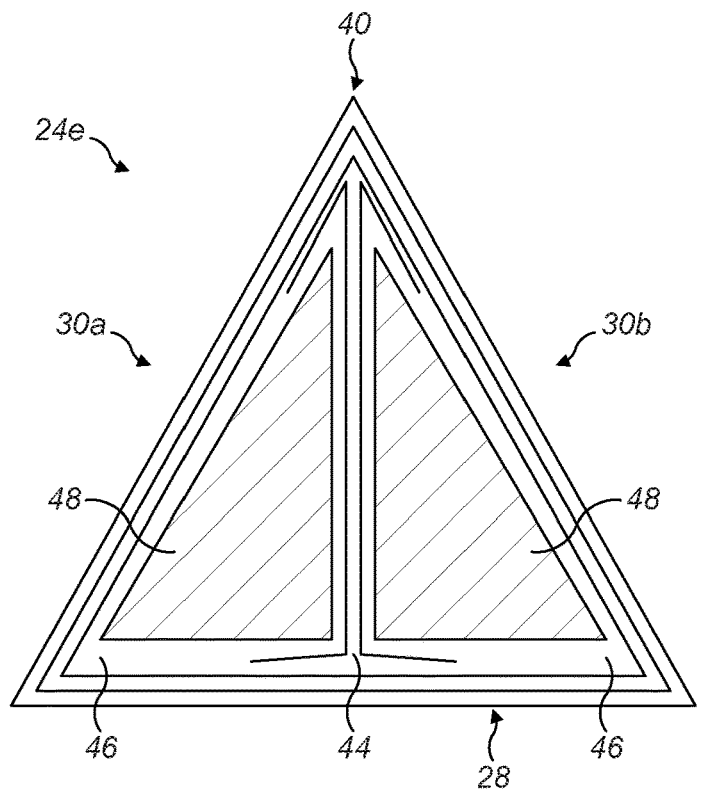
FIG. 16 schematically shows a web foot of triangular cross-section according to a further embodiment of the present invention.

FIG. 16 shows a web foot 24*e* of triangular cross section. The web foot 24*e* comprises a base 28 and first and second side walls 30*a*, 30*b* inclined relative to the base 28. The side walls 30*a*, 30*b* are inclined towards one another and converge to define an apex 40 above the centre of the base 28. The web foot 24*e* further comprises a central internal wall 44 extending perpendicular to the base 28 between the base 28 and the apex 40 defined by the side walls 30*a*, 30*b*. Similar to previous embodiments, the base 28, side walls 30*a*, 30*b* and internal wall 44 are formed of composite material comprising plies. The web foot 24*d* optionally additionally includes filler material 48 in the internal cavities 46 on each side of the internal wall 44. The filler material 48 in this example is of triangular cross section. The filler material 48 may comprise foam, balsa low-density plastic or resin, polystyrene etc. Alternatively, the filler material 48 may be omitted and the cavities 46 may be empty, e.g. air-filled. In other examples, a triangular web foot may comprise multiple internal walls 44, for example similar to the example shown in FIG. 4.

Figure 17:
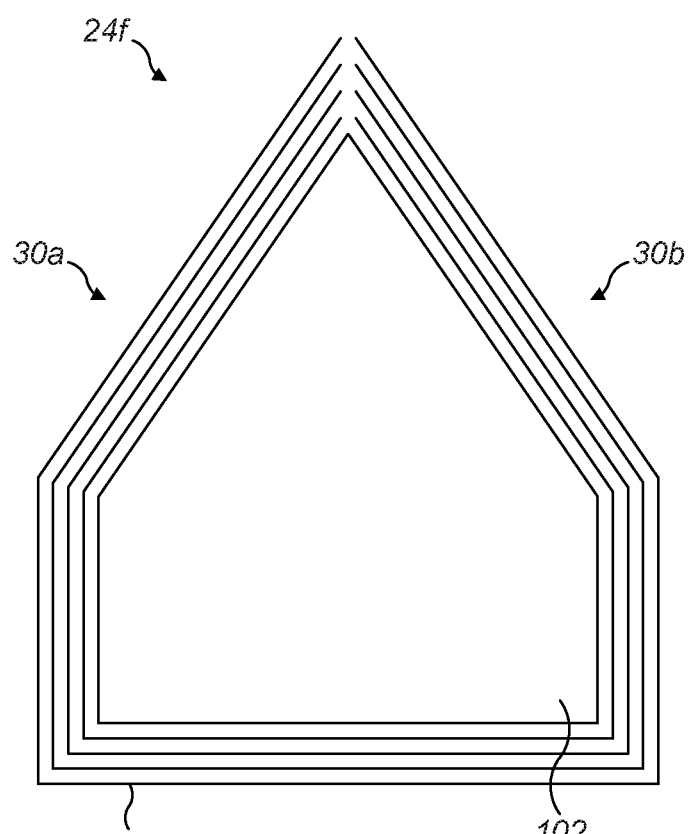
FIG. 17 schematically shows a hollow web foot according to a yet further embodiment of the present invention.

A further variant of a web foot 24*f* is shown in FIG. 17. The web foot 24*f* is shaped as an irregular pentagon, and in this respect is similar in overall shape to the embodiment shown in FIG. 3. However, in this example, the web foot 24*f* does not include any internal walls or filler material. Instead, the base 28 and side walls 30*a*, 30*b* together define a substantially hollow interior 102 of the web foot 24*f*.

Any of the web feet 24*a-f* described herein may be integrated with a shear web panel 22 in a similar manner to that discussed by way of example with reference to FIG. 5. The features of the web feet 24*a-f* are also generally interchangeable between embodiments, and further examples are envisaged in which features of the various examples may be combined together or exchanged. Accordingly, features described in relation to any particular example are generally applicable to all embodiments.

The examples described above are not intended to limit the scope of the present invention as defined in the accompanying claims. Many modifications may be made to these examples without departing from the scope of the claims. For example, web feet of any suitable shape are envisaged, and the web feet may have any number of load-bearing internal walls that function to spread load across the base of the web feet resulting in loads being spread out across the adhesive bond line in use. The web feet may be made of any suitable material. The number of plies shown in the figures is purely illustrative, and may vary according to design specifications. Whilst the side walls in the above examples mutually converge to define an apex at the point of maximum height of the web foot, other embodiments are envisaged in which the side walls may be mutually spaced apart at the maximum height of the web foot, in which case the web foot may have a flat or curved top portion.

The invention claimed is:

1. A wind turbine blade shear web foot, the shear web foot extending longitudinally and comprising:
    a base for attaching to an internal surface of the blade;
    first and second side walls extending respectively from opposite longitudinal sides of the base, at least part of each side wall being inclined relative to the base and inclined towards the other side wall,
    a web-foot interior defined at least in part by the base and the first and second side walls; and
    one or more internal walls in the web-foot interior, the one or more internal walls extending between the base and the first and/or second side walls and being spaced apart from the first and second side walls to define a plurality of chambers within the web-foot interior,
    wherein the first and second side walls converge to define an apex of the web foot, and wherein the web foot comprises a central internal wall extending substantially between the base and the apex of the web foot.

2. The shear web foot of claim 1, wherein each of the one or more internal walls is substantially perpendicular to the base.

3. The shear web foot of claim 1, wherein the web foot comprises a plurality of internal walls spaced apart from each other and defining chambers in-between.

4. The shear web foot of claim 1, wherein the chambers contain filler material including one or more of foam core, balsa, low-density plastic or resin, or are hollow.

5. The shear web foot of claim 1, wherein the base, side walls, and internal walls are formed from composite material comprising one or more fibrous plies.

6. The shear web foot of claim 1, wherein at least some of the plies forming the internal walls also at least partially form the base and/or a side wall of the web foot.

7. The shear web foot of claim 1, wherein the web foot is substantially triangular or shaped as an irregular pentagon in transverse cross-section.

8. The shear web foot of claim 1, wherein the web foot is formed by pultrusion.

9. A shear web for a wind turbine blade comprising a web panel and a shear web foot as defined in claim 1.

10. The shear web of claim 9, wherein the web panel comprises a laminate formed from a plurality of plies, and wherein at least some of the plies forming the web panel also at least partially form a side wall and/or an internal wall of the shear web foot.

11. The shear web of claim 10, wherein the plies of the web panel are tapered onto the shear web foot.

12. A wind turbine blade comprising a spar cap and the shear web of claim 9, wherein the base of the web foot is attached to the spar cap and the side walls and the one or more internal walls of the web foot provide load-transfer paths between the spar cap and the web panel.

\* \* \* \* \*